July 14, 1953　　A. L. THOMPSON ET AL　　2,645,003
CUTTING TOOL
Filed Feb. 9, 1950　　　　　　　　　　　　4 Sheets-Sheet 3
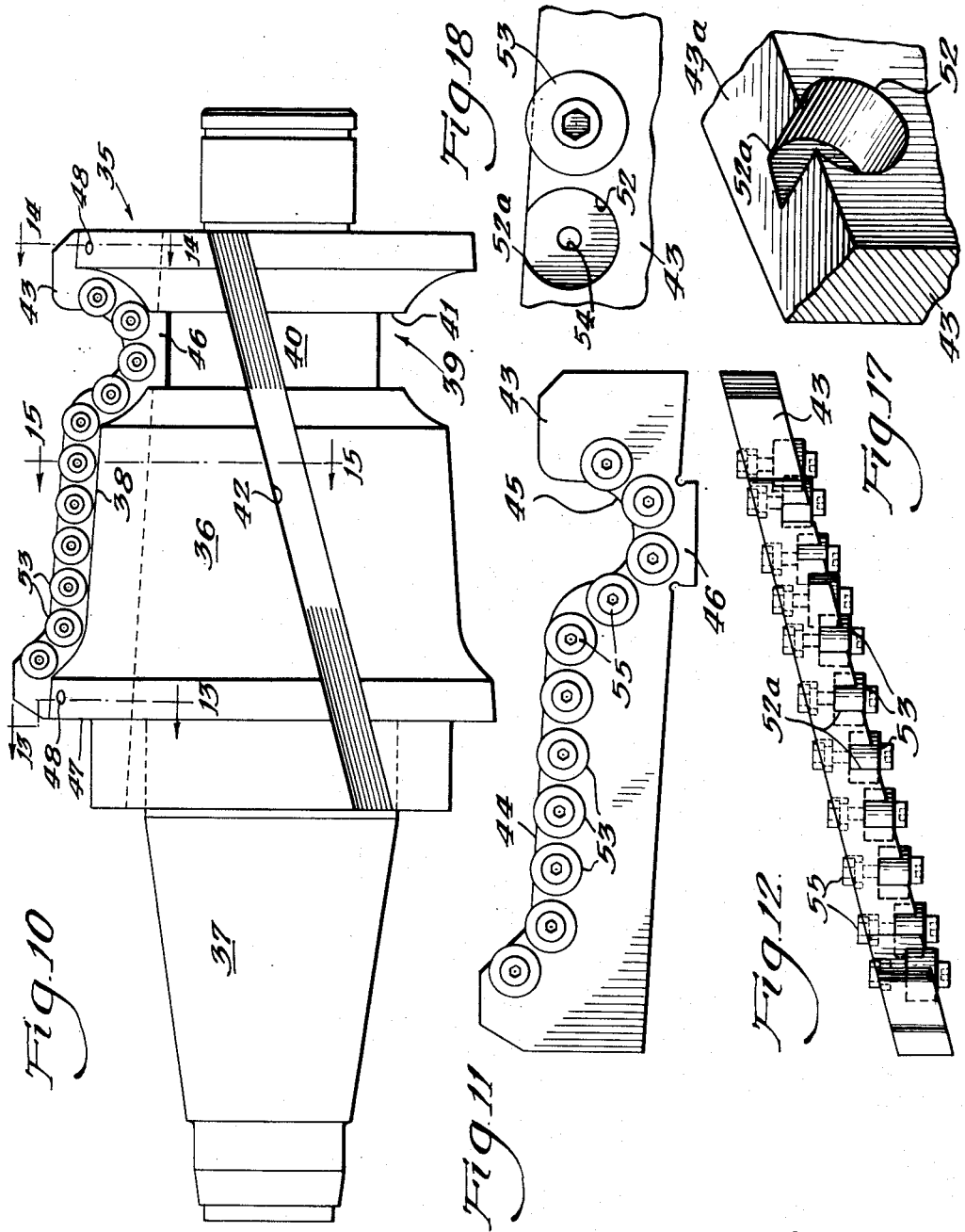
Inventors:
Alfred L. Thompson
Karl T. Nystrom
Jesse H. McQuiddy
Richard B. Stanley
By: Zabel and Fitzbaugh
attys July 14, 1953  A. L. THOMPSON ET AL  2,645,003
CUTTING TOOL
Filed Feb. 9, 1950  4 Sheets-Sheet 4
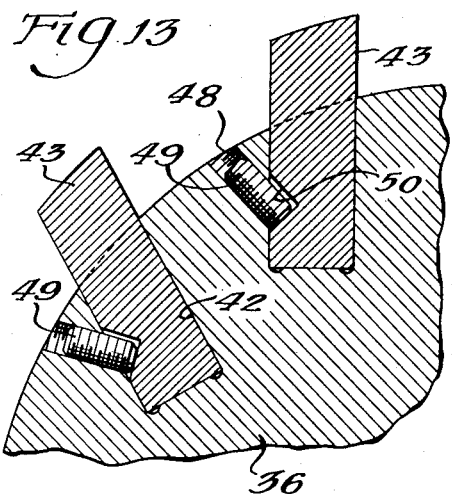
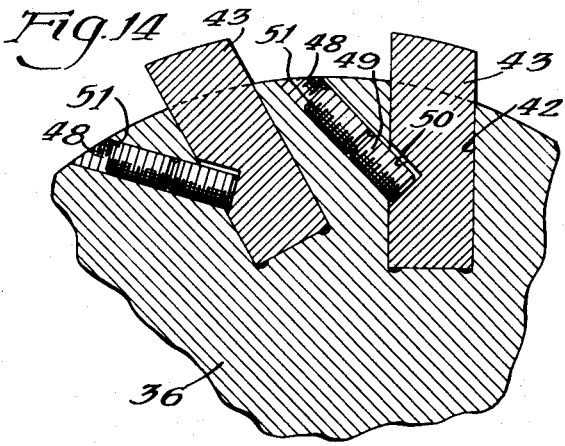
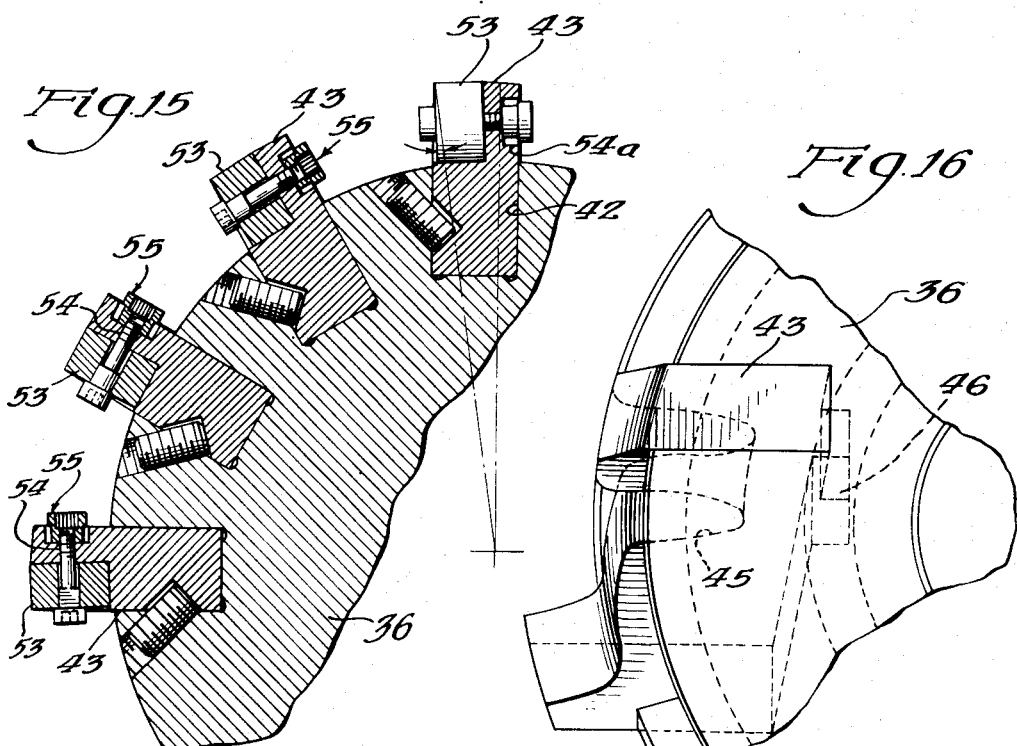
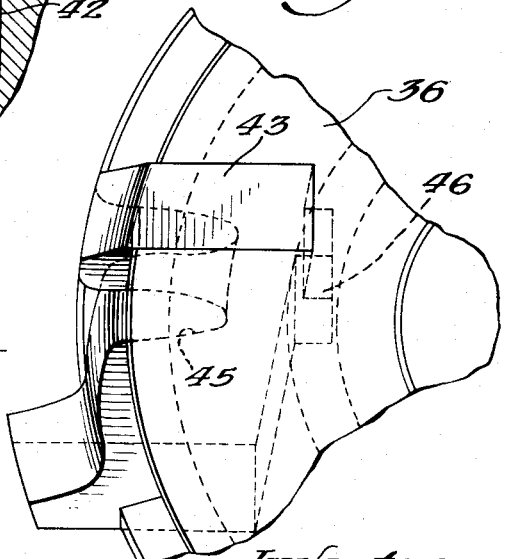
Inventors:
Alfred L. Thompson
Karl T. Nystrom
Jesse H. McQuddy
Richard B. Stanley
By Zahl and Gritzbaugh
Attys Patented July 14, 1953

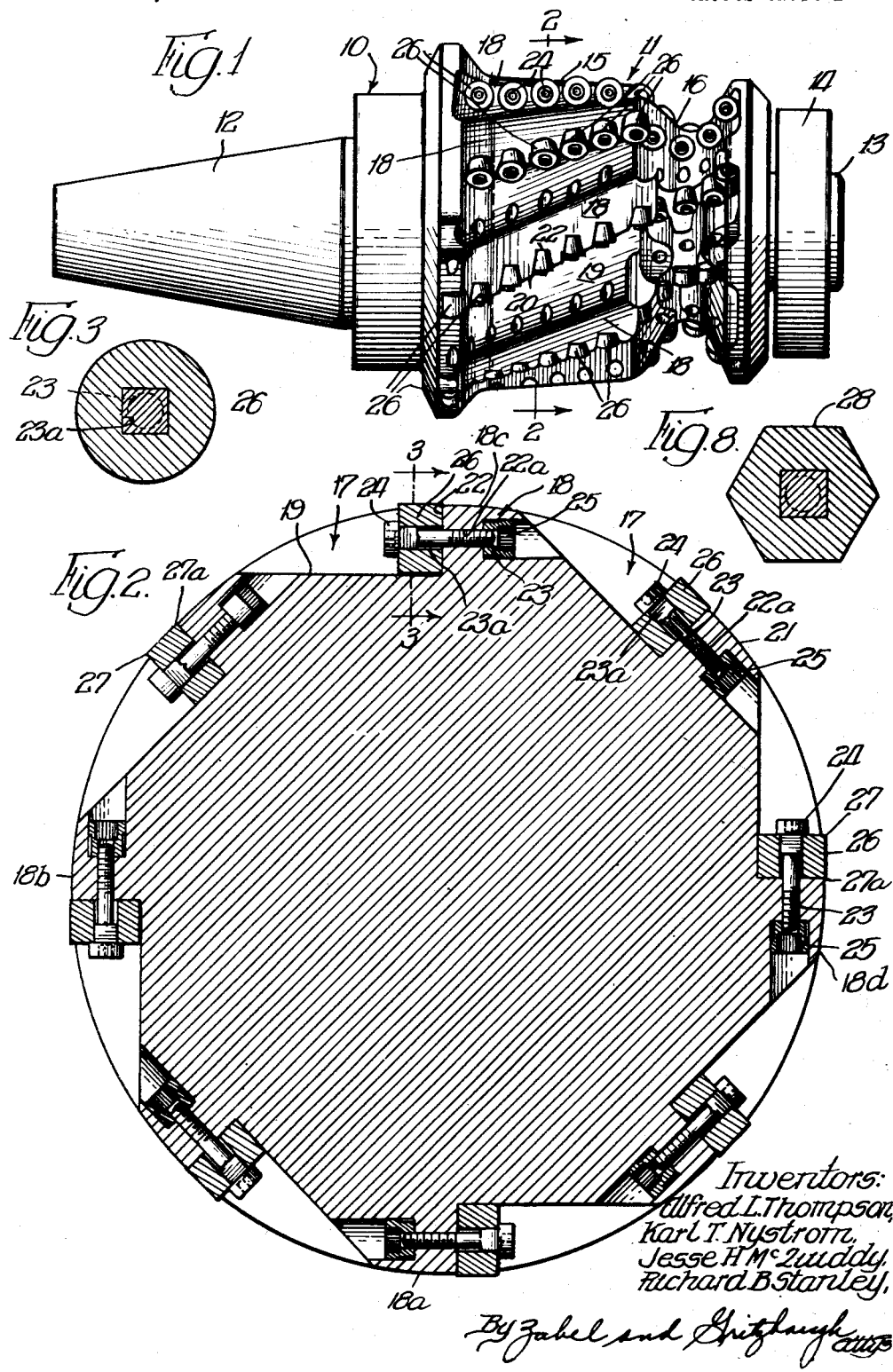

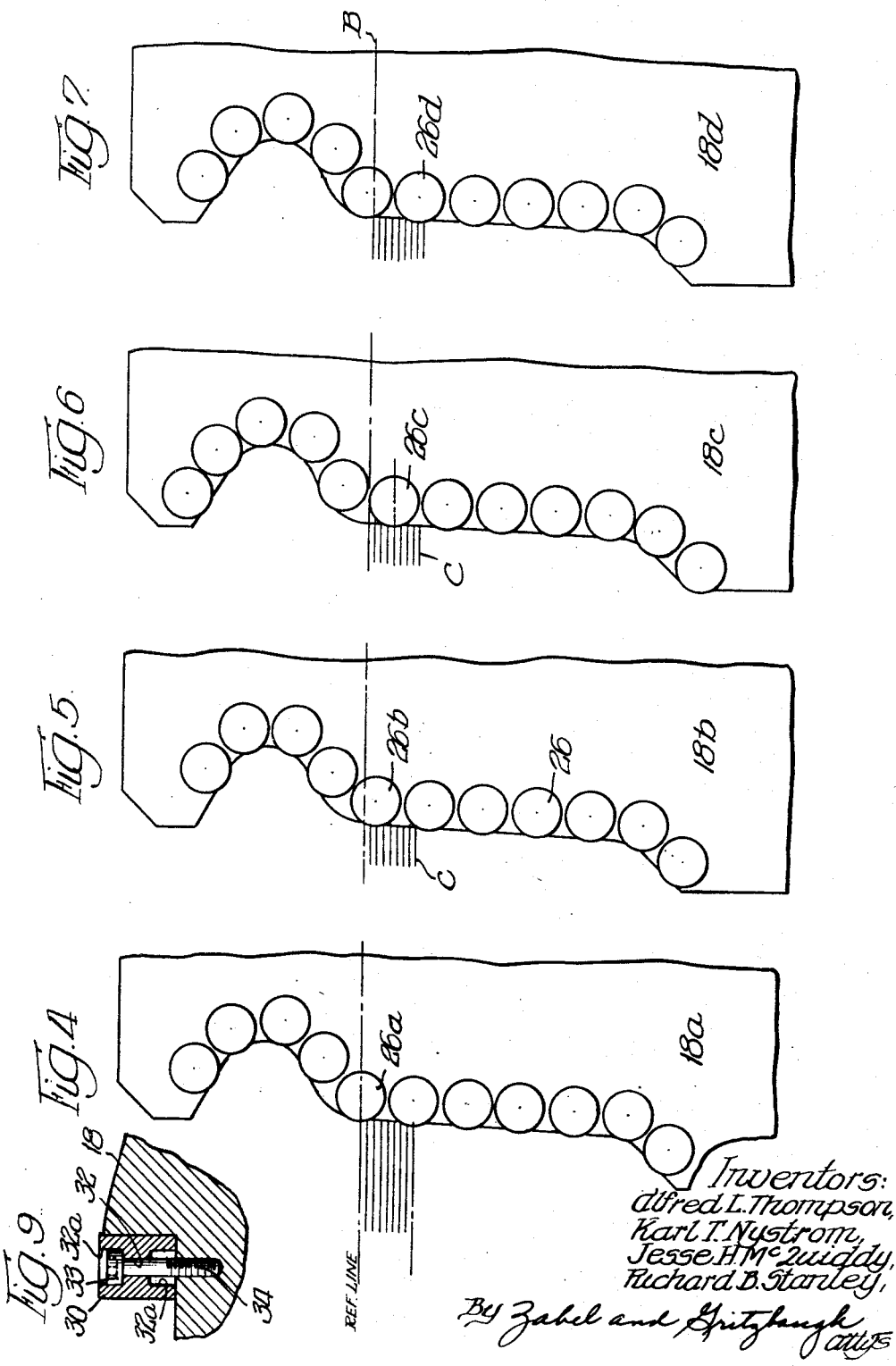

2,645,003

UNITED STATES PATENT OFFICE 2,645,003

CUTTING TOOL

Alfred L. Thompson, Munster, Ind., Karl T. Nystrom, Chicago, Ill., Jesse H. McQuiddy, St. Louis, Mo., and Richard B. Stanley, Park Ridge, Ill.; said Thompson, said Nystrom, and said McQuiddy assignors to Standard Railway Equipment Manufacturing Company, Chicago, Ill., a corporation of Delaware; said Stanley assignor, by mesne assignments, to World-O-Matic Company, Chicago, Ill., a partnership Application February 9, 1950, Serial No. 143,254

22 Claims. (Cl. 29—105)

The present invention relates to a cutter and particularly to a milling type of cutter that is ideally suited for use in truing metal wheels of the type used on vehicles that operate on metal rails. In the case of railway cars and locomotives, the wheels are equipped with tread and flange portions that engage and move along steel rails. Both the tread and flange portions of the wheel are subject to wear and other abuses that result in the formation of surface damage and irregularities that at least materially reduce the good riding qualities of the vehicles. As a result of uneven wear conditions or improper service or emergency applications of the car brakes, the wheels lose their roundness or their tread and flange surfaces are marred to the extent that the original concentricity must be restored and the tread and flange must be returned to their required contour.

The present invention has to do particularly with a milling type of cutter that very effectively mills the tread and flange of the wheels at the same time and, when used in a machine that maintains the proper relationship between the cutter and the center of the wheel during cutting operation, very effectively produces a properly finished surface for both the wheel tread and flange.

The invention obviously is applicable to cutters other than those intended for use in connection with rail vehicle wheels, but for illustrative purposes a cutter used in connection with truing railway car wheels is shown.

A cutter embodying the present invention is strong and sturdy and is provided with a plurality of cutter buttons or cutter elements in which only a portion of the total cutting edge of each cutter button is used during a cutting operation. Each cutter button in turn is adjustably mounted on the head of the cutter so that a new cutting edge can very simply and quickly be moved into cutting position when a used cutting edge becomes worn.

Each of the cutter buttons mounted on the cutter body is firmly held in place and is backed up by a solid base or seat that makes for rigidity of the tool during the cutting operation. Since both the tread and flange portions of a wheel are milled during a single cutting operation, there is apt to be considerable vibration of the cutter and the machine upon which the cutter is mounted during the milling operation. This vibration is reduced to a minimum, however, when the present cutter is used because of the rigidity of the cutter itself and the cutter buttons forming part of the cutter, and also because the cutter buttons form a natural chip breaker. This inherent rigidity makes it possible to produce finished surfaces on the tread and flange of the wheels that are well within the tolerances permitted by this particular type of machining operation. It also reduces to a minimum the degree of shock on the cutter and cutter buttons, thereby effecting an increase in the life of these members. This result is accomplished even though relatively deep cuts can be taken during each operation.

In one embodiment of the invention described hereinafter, cutter buttons are mounted directly on stationary ribs formed on the cutter body. It may be desirable, however, to harden the rib portions of the cutter body by appropriate heat treatment and in this instance the ribs may be formed so that they can be readily removed from the cutter body. Such an arrangement is illustrated in the second embodiment of the invention.

All of the foregoing constitute some of the principal objects and advantages of the present invention, others of which will become apparent from the following description and from the drawings, in which:

Fig. 1 is a plan view of a cutter illustrating one embodiment of the present invention;

Fig. 2 is an enlarged, transverse, sectional view of the cutter, the view being taken along the line 2—2 of Fig. 1;

Fig. 3 is a transverse, sectional view of a cutter button or cutter cylinder forming part of the cutter, the view being taken along the line 3—3 of Fig. 2;

Figs. 4 to 7 inclusive are diagrammatic views illustrating the relative positions of the cutter buttons in their more or less helical progressive arrangement around the circumference of the cutter, the views showing every other rib disposed about the cutter head; the cutter buttons illustrated in Fig. 4 representing those mounted along a first longitudinally extending rib shown in Fig. 1; the cutter buttons shown in Fig. 5 representing those mounted along a third longitudinal rib shown in Fig. 1; and the cutter buttons in each of Figs. 6 and 7 illustrating the relative positions of the cutter buttons on the fifth and seventh longitudinal ribs disposed about the circumference of the cutter shown in Fig. 1;

Fig. 8 is a sectional view corresponding to Fig. 3 but showing a modified form of cutter button;

Fig. 9 is a partial cross section corresponding to Fig. 2 but illustrating a modified form of cutter button and mounted position thereof;

Fig. 10 is a plan view of a cutter illustrating a second embodiment of the present invention;

Fig. 11 is an enlarged, side elevational view of one of the removable blades employed in this second cutter;

Fig. 12 is a top plan view of the blade shown in Fig. 11;

Fig. 13 is an enlarged, fragmentary, transverse sectional view taken through the cutter, the view being taken along the line 13—13 of Fig. 10;

Fig. 14 is an enlarged, fragmentary, transverse sectional view taken at a different position through the cutter, the view being taken along the line 14—14 of Fig. 10;

Fig. 15 is an enlarged, fragmentary, transverse sectional view taken at still another position of the cutter, the view being taken along the line 15—15 of Fig. 10;

Fig. 16 is a fragmentary end elevational view of the cutter shown in Fig. 10, the view being taken in the direction looking from right to left as viewed in Fig. 10, the buttons and their sockets being omitted;

Fig. 17 is an enlarged, fragmentary perspective view of one of the blades illustrating a socket in which a cutter button is mounted; and Fig. 18 is an enlarged, fragmentary, front elevational view of the blade and socket shown in Fig. 17, the view also illustrating a cutter button mounted in the socket.

This is a continuation-in-part of applicants' copending application, Serial No. 125,852, filed November 7, 1949, now abandoned.

For purposes of illustration certain embodiments only of the present invention are shown and will be described hereinafter, though it is recognized that numerous modifications will occur to the man skilled in the art and it is intended that such modifications may be made without departing from the scope and spirit of the invention.

Referring now to the drawings and particularly to Figs. 1 and 2 the present invention is herein illustrated in one form by a cutter generally indicated at 10 that is useful particularly in performing milling operations on the tread and flange portions of wheels of railroad cars, locomotives and similar vehicles that operate on steel rails. This cutter 10 comprises a cutter head portion indicated generally at 11 and an arbor portion 12. The arbor portion 12 is adapted to fit into and be held by a conventional chuck of a milling or truing machine suitable for this type of operation. A shaft 13 projects outwardly from and is integral with the head portion 11. A suitable bearing 14 is mounted on the shaft 13.

This cutter head 11 is generally circular in cross section as illustrated in Fig. 2 and is provided with a peripheral contour extending lengthwise of the cutter 10 that provides a relatively flat portion indicated at 15 that corresponds with the tread of the car wheel, and a concave or valley portion 16 that corresponds with the flange portion of the car wheel, these two portions 15 and 16 being congruent with respect to the car wheel tread and flange portions respectively.

Substantially longitudinal grooves 17 are formed in the peripheral surface of the cutter head 11 that extend throughout the entire length of the tread portion 15 and the flange portion 16. These grooves 17 are spaced apart about the circumference of the cutter head or body 11 to form therebetween a plurality of substantially longitudinally disposed ribs 18 that likewise extend throughout the length of the tread portion 15 and the flange portion 16 of the cutter head. Each of the grooves 17 as shown in Fig. 1 has a flat face 19 that extends from the periphery of the cutter head or body 11 inwardly at right angles to a radius of the cutter head and meets with a radially disposed wall or shoulder 20 that forms one wall of the adjacent rib 18. For purposes of identifying this wall 20, it shall be assumed that the direction of rotation of the cutter 10 during the milling operation is counterclockwise as viewed in Fig. 2 so that this wall 20 of each of the ribs 18 may be termed the leading wall or side of the rib. The opposite wall formed by the flat face 19 of each of the ribs 18 may be termed the retreating wall or side of the rib. The outer wall 21 of each of the ribs 18 forms the tread portion 15 and flange portion 16 of the cutter head.

Each of the ribs 18 is bored or otherwise provided with socket-like apertures 22 that extend part of the way through the rib from the leading face 20 toward the retreating face. An aperture 22a of smaller diameter connects this socket 22 with an enlarged aperture 22b that opens through the retreating face. These sockets 22 and apertures 22a and 22b are spaced throughout the length of each rib 18. Mounted in each of the sockets 22 is a cutter button 26, which in the form of the invention shown in Figs. 1 and 2, is cylindrical in shape. Each cutter button 26 is mounted on a threaded screw 23 that extends through apertures 22a and 22b. On one end of the screw 23 is a head 24 and on the other end is threaded a nut 25 that is received in enlarged aperture 22b. Each cutter is drawn up tightly by the screw 23 and nut 25 into its socket 22. Because of the lateral support given to the cutter by the sides of the socket, the screw 23 is not subjected to shearing stresses but merely serves to hold the button firmly against the seat of the socket.

As best shown in Figs. 4 to 7 inclusive the cutter buttons 26 are spaced apart in side by side relationship along each of the ribs 18. In a circumferential direction about the cutter head 11 the cutter buttons are arranged in screw-like helical progression. In other words, in the direction about the circumference of the cutter head, the cutter buttons are aligned in such a manner that they lie substantially on a screw-like helix that extends from one end of the cutter head 11 to the opposite end thereof. This screw-like helical progressive arrangement is best illustrated in Figs. 4 to 7 inclusive where a reference line B is provided and eight equally spaced division lines are shown adjacent to this reference line. For purposes of this description it can be assumed that each of these reference lines represents a plane passing normally through the cutter head so as to bisect one cutter button along its longitudinal axis.

In Figs. 4 to 7 inclusive the bisected buttons are identified by the reference characters 26a, 26b, 26c and 26d. These four figures illustrate the relative positions of the buttons on every other rib disposed about the circumference of the cutter head shown in Fig. 1 and consequently cutter button 26a shown in Fig. 4 is bisected by the reference line B; the cutter button 26b illustrated in Fig. 5 is bisected by the reference line C spaced two division lines away from reference line B; button 26c shown in Fig. 6 is spaced four division lines away from reference line B; and cutter button 26d shown in Fig. 7 is spaced six division lines away from reference line B. These specific cutter buttons 26a, 26b, 26c and 26d are disposed respectively, on ribs 18a, 18b, 18c and 18d (see Fig. 2).

As previously mentioned each of the cutter buttons 26 as shown in Figs. 1 and 2 is cylindrical in form. When mounted on the cutter head 11 in the manner just described each cutter button 26 is disposed with its leading face parallel with respect to the longitudinal axis of the cutter and provides a cutting edge indicated at 27 in Fig. 2 that is disposed on the leading side of the cutter button with reference to the direction of rotation of the cutter. This cutting edge projects slightly beyond the outer periphery of the body of the cutter head as can be seen both in Figs. 1 and 2.

During the cutting operation the cutter 10 is rotated in a counterclockwise direction as viewed in Fig. 2 and is then brought into engagement with the peripheral face of the wheel of a railway car or locomotive. The relationship between the cutter head 11 and the car wheel is such that the tread and flange portions 15 and 16 of the cutter are congruent with respect to the tread and flange portions respectively, of the wheel. At the time the cutter is first brought into engagement with the car wheel, the wheel may be held motionless so that the depth of cut can be initially adjusted by effecting a bite of the cutter button 26 into the metal. The depth of the cut may also be adjusted while the wheel rotates. After the depth of cut has been adjusted, the car wheel upon which the operation is being performed, is slowly rotated in a direction such as to feed the surface of the wheel into the leading or cutting edge 27 of the cutter buttons. The milling operation is thereby commenced. After the car wheel has been rotated through 360° a complete milling operation has been effected over the entire peripheral surface of the tread and flange. If the condition of the wheel is such as to require a second milling operation in order to remove all undesirable surface irregularities, the cutter is again fed further into the metal in order to cause a deeper bite to be taken by the cutter buttons.

When as a result of wear or damage to the cutting edge 27 of any or all of the cutter buttons 26, a new sharp edge is required, a simple adjustment can be performed by merely rotating the cutter button 26 so as to bring into cutting position a new portion of the cutting edge 27. After the entire circumference of the leading cutting edge has been thus used, the cutter button 26 can be turned around so as to present as the leading edge its opposite edge identified as 27a in Fig. 2. There is, therefore, provided a second series of cutting edges on each of the cutter buttons that can be progressively utilized in the manner just described.

To aid in this adjustment the screw 23 can be provided with a portion 23a (Fig. 3) that is square or rectangular in cross section corresponding to a square or rectangular aperture in the cutter button 26.

Since the cutter buttons 26 are cylindrical in shape and all have the same diameter, the setting of the distance between the center of the cutter head 11 and the cutting edge 27 is automatic. In other words, it is only necessary to mount the cutter buttons firmly in place on the cutter and no attention need be given to setting the cutter other than that required to present a sharp edge for the cutting operation. This last mentioned adjustment is performed in the manner previously described by simply rotating the cutter button. Thus the diameter and contour of the cutter is always the same and no adjustment whatever is needed to compensate for sharpening the cutting portion of the cutter as is required in the conventional tools. The series of cutter buttons provide natural chip breakers in the cutting operation.

As shown the cutting edge of each of the cutter buttons is arcuate in shape, thereby providing maximum strength to the cutting edge. Each cutter button is firmly supported on all sides and rigidly backed up in its socket 22. Thus the cutter buttons are not only strong due to their shape and thickness, but they are firmly backed up and supported by massive metal that provides extreme rigidity to the entire cutter.

Since the shape of the cutter buttons is cylindrical in cross section, the bite which the cutter takes in the metal upon which the cutter is being used, is arcuate in cross section. Due to the fact that there is an overlapping in the paths of successive cutters due to their arrangement about the peripheral surface of the cutter head, the depth of the grooves formed on the finished surface is very small and over the entire tread and flange portions of a car wheel that has been finished or milled with the present tool, the effect of these minor grooves is negligible. If it should be desired, however, to eliminate these grooves so as to produce a smooth surface, the cross sectional shape of the buttons 26 may be polygonal; that is in the shape of an octagon, hexagon, as shown in Fig. 8, square or the like, so that the cutting edge will be straight rather than arcuate in shape. The cutting edges in any of these polygonal shaped buttons are the straight portions indicated, for example, at 28 in Fig. 8. With this form of cutter button the same adjustments can be made as previously described so as to replace sharp for dull edges.

Because of the ease of effecting adjustment and of replacing completely worn out cutter buttons, any unskilled mechanic can maintain the present cutter with an ordinary wrench and the service of a specially skilled person is not required. At the same time a cutter possessing uniformly accurate characteristics is always available without the use of any grinding equipment and without reliance on specially trained personnel to maintain sharp cutting edges.

By referring to Fig. 2 it will be noted that the entire cutter button 26 is completely supported except for the very small portion that projects above the periphery of the body portion of the cutter. The small projection of the button beyond the periphery of the cutter body is provided in order to supply the necessary cutting surface on the tool.

The cutting face of each button may be disposed in front of or on the radius of the cutter to which the button is disposed normal to such an extent that the rake angle of the cutting face is between 0° and 20° negative. When all of the cutting surfaces on one edge are used or damaged, a sharp cutting edge can be restored by merely face grinding the flat face of the button.

Though the first embodiment of the invention shown in the drawings and thus far described shows the cutter buttons 26 mounted on each rib with the axis of the button disposed normal to a radius of the cutter head, it is recognized that the buttons can be mounted with their cylindrical axes disposed on or parallel to a radius of the cutter head. In this arrangement a plurality of apertures would be drilled or formed in the outer wall 21 of each rib and the cutter buttons would be mounted in each of these apertures with a portion of the button projecting beyond the wall 21. This form of the invention is diagrammatically illustrated in Fig. 9 of the drawings where a modified button 30 is shown mounted in an aperture 31 that is disposed in the rib 18. In this embodiment of the invention the cutter button 30 is apertured as at 32 along its longitudinal axis, the outer ends of this aperture at 32a being square, rectangular or noncircular in cross section to accommodate the circular head 33 of a screw 34 that is threaded into the body of the cutter head.

Referring now to Figs. 10 to 18 inclusive, still another embodiment of the invention is shown in the form of a cutter that is generally indicated at 35 in which the cutter body is shown at 36 and the shank is shown at 37. In this form of the invention the cutter body 36 is substantially circular in cross section as before and is contoured on its peripheral surface so as to form a tread portion 38 and a flange portion generally indicated at 39. In this instance the flange portion 39 is provided with one section 40 of reduced diameter, forming with the adjacent sections on both sides thereof an annular slot 41.

A plurality of elongated slots 42 are provided about the circumference of the cutter body 36 and each of these slots extends throughout the entire length of the cutter body 36. As best illustrated in Fig. 15 these slots 42 are disposed about the entire circumference of the body 36 and are spaced apart at about 30°. As shown in Fig. 10, each of these slots 42 is straight throughout its length, and though it is disposed generally in a longitudinal direction on the body 36, each slot extends somewhat askew with respect to the axis of the cutter.

Disposed in each of the slots 42 is a removable cutter blade 43 that as shown in Fig. 11 is elongated and on its upper face or edge has a flange portion 44 and a grooved-out tread portion 45 that are substantially congruent with the tread and flange portions respectively, of a vehicle or railroad car wheel of the type previously described. The bottom face of the blade 43 is straight throughout substantially its entire length but is provided with a downwardly projecting key portion 46. When the blade 43 is mounted in one of the slots 42 in the cutter body 36 it extends from the forwardmost face of the cutter body to the rear face indicated at 47 and the key portion 46 projects into the annular slot 41. The length of the key portion 46 corresponds with the width of the slot 41 so that when the blade 43 is in place on the cutter body, the side wall of the slot 41 firmly holds the key 46 and hence the entire blade against longitudinal movement on the cutter body.

As shown in Figs. 13 to 15 inclusive, the cutter body is apertured at 48 adjacent to each of the longitudinal slots 42 and is threaded to receive machine screws 49 that enter notches 50 in the adjacent blade 43. There is a sufficient number of apertures 48 disposed lengthwise of each blade so that the blade can be effectively and rigidly secured to the cutter body. If necessary, a lock screw 51 can be inserted in some of the apertures 48 and locked against the machine screws 49 to lock such screws in place.

As best shown in Figs. 11, 15, 17 and 18, each of the blades 43 is apertured at 52 at spaced positions throughout the length of the blade to receive buttons 53. Each aperture 52 is circular in cross section and extends only part way through the thickness of the blade so as to form a socket in which the cutter button 53 may be firmly held. As best shown in Figs. 17 and 18, each of the sockets 52 projects through the upper face 43a of the blade so as to form an opening 52a through which the cutter button 53 projects as best shown in Fig. 18. A smaller aperture 54 (see Fig. 15) extends from the inner face of the socket 52 to the opposite side of the blade 43, this smaller aperture 54 opening out into the somewhat larger aperture 54a at the rear face of the blade. Thus a bolt 55 as in the case of the first embodiment of the invention, can be employed to hold the cutter button 53 in place and the relationship between the cutter button and this bolt is such that the cutter button can be rotated progressively in its socket so as to expose different cutting edges when they are required.

Also in this form of the invention, the cutter buttons in one blade are staggered with respect to those in the next blade so as to provide the same body of progression previously mentioned in connection with the first embodiment of the invention. This second cutter will perform in exactly the same manner as the first cutter, the only difference being that instead of having stationary ribs to support the cutter buttons as disclosed in the first embodiment, the ribs in this second embodiment are in the form of removable blades which can be replaced if necessary, when they are damaged.

The primary advantage of the removable blades over the stationary ribs disclosed in the first embodiment is the fact that these blades can be separately hardened by proper heat treatment without requiring the massive cutter body to be similarly heat treated. As previously described in connection with the first embodiment the other shapes of cutter buttons can also be used in connection with this last embodiment of the invention.

We claim:

1. A cutter comprising a body of substantially circular cross section having a plurality of spaced ribs disposed generally longitudinally of the body, a plurality of cylindrical cutter buttons mounted along each rib each button being positioned with its longitudinal axis disposed substantially normal to a radius of the body, each button having an end face providing a plurality of cutting edges disposed about the periphery of the end face, the buttons along each rib being staggered with respect to the buttons on the next adjacent rib, each button projecting beyond the outer face of the rib and being rotatably indexable about its longitudinal axis to bring successive cutting edges into cutting position.

2. A cutter comprising a body of substantially circular cross section having a plurality of spaced ribs disposed generally longitudinally of the body, the body being adapted to rotate about a longitudinal axis with respect to the body, the ribs having leading edges with respect to the direction of rotation of the body, a plurality of cylindrical cutter buttons mounted along each rib adjacent to the leading edge thereof each button being positioned with its longitudinal axis disposed substantially normal to a radius of the body, each button having an end face providing a plurality of cutting edges disposed about the periphery of the end face, the cutter buttons along each rib being staggered with respect to the buttons on the next adjacent rib, each button projecting beyond the outer face of the rib and being rotatably indexable about its longitudinal axis to bring successive cutting edges into cutting position.

3. A cutter comprising a body of substantially circular cross section, a plurality of ribs disposed generally longitudinally of the body but spaced apart circumferentially, and a plurality of cylindrical cutter buttons mounted on each rib and arranged substantially side by side along the length of the rib each button being positioned with its longitudinal axis disposed substantially normal to a radius of the body, each button having an end face providing a plurality of cutting edges disposed about the periphery of the end face, each button being rotatably indexable about its axis to bring successive cutting edges into cutting position, the buttons along each rib being so aligned with the buttons on the next adjacent rib that the buttons are arranged approximately in helical progression about the circumference of the body.

4. A cutter comprising a body of substantially circular cross section, a plurality of ribs disposed generally longitudinally of the body but spaced apart circumferentially, and a plurality of cutter buttons mounted on each rib and arranged substantially side by side along the length of the rib each button being positioned with its longitudinal axis disposed substantially normal to a radius of the body, each button having an end face providing a plurality of cutting edges disposed about the periphery of the end face, each button being cylindrical in shape and being indexable on the rib about its longitudinal axis to bring successive cutting edges into cutting position, the buttons along each rib being so aligned with the buttons on the next adjacent rib that the buttons are arranged approximately in helical progression about the circumference of the body.

5. A cutter comprising a body of substantially circular cross section having a plurality of spaced ribs disposed generally longitudinally of the body, a plurality of sockets disposed in each rib in spaced relationship along the rib and extending in a direction substantially normal to a radius of the cutter, the sockets along each rib being staggered with respect to the sockets in the next adjacent rib, a cutter button secured in each socket, each button having a minor portion projecting beyond the outer face of the rib and being rotatably adjustable in the socket.

6. A cutter comprising a body of substantially circular cross section having a plurality of spaced ribs disposed generally longitudinally of the body, a plurality of sockets disposed in each rib in spaced relationship along the rib and extending in a direction substantially normal to a radius of the cutter, the sockets along each rib being staggered with respect to the sockets in the next adjacent rib, a cutter button adapted to be received in each socket, and means mounting each button in its socket so that the button can be rotated about the mounting means, a minor portion of each button projecting beyond the outer face of the rib.

7. A cutter comprising a body portion having a longitudinal axis, a plurality of ribs on the body disposed generally in a longitudinal direction with respect to the body, the outer faces of the ribs forming tread and flange portions that are substantially congruent respectively with respect to the tread and flange of a vehicle wheel of the class described, and a plurality of cutter buttons embedded along each rib with a minor portion of each button projecting beyond the outer face of the rib.

8. A cutter comprising a body of substantially circular cross section, a plurality of series of spaced cutter buttons embedded within said body and arranged substantially side by side generally longitudinally along the length of the body with a minor portion of each button projecting beyond the surface of said body, each button being provided with a plurality of cutting edges about its periphery, the cutting edges being equidistant from the longitudinal axis of the button, each button being rotatable about its longitudinal axis, the buttons in each series being aligned with the buttons in the other series so that the cutting edge of each button provides an independent increment of cut partially overlapping the increment of cut of the cutting edge of at least one other button.

9. A cutter comprising a body of substantially circular cross section, a plurality of cutter buttons embedded within and about the periphery of the body, a minor portion of each button projecting beyond the said periphery, each cutter button having an end face disposed substantially normal to the longitudinal axis of the button, a plurality of cutting edges disposed about the periphery of the end face, each cutter button being indexable to bring successive cutting edges into cutting position, each cutter button being positioned with its longitudinal axis disposed substantially normal to a radius of the body, the entire plurality of buttons providing a set of cutting edges, each of which cutting edge provides a transverse increment of cut across the cutter body partially overlapping the increment of cut of the cutting edge of at least one other button.

10. A cutter comprising a body portion having a longitudinal axis, a plurality of removable blades mounted on the body and disposed generally in a longitudinal direction with respect to the body, the outer faces of the blades forming tread and flange portions that are substantially congruent respectively with the tread and flange of a vehicle wheel of the class described, and a plurality of cutter buttons mounted along each blade, each button projecting beyond the outer faces of the blades.

11. A cutter comprising a body portion having a longitudinal axis, a plurality of removable blades mounted on the body and disposed generally in a longitudinal direction with respect to the body, the outer faces of the blades forming tread and flange portions that are substantially congruent respectively with the tread and flange of a vehicle wheel of the class described, each blade having a plurality of concave sockets disposed in a side face thereof and spaced throughout the length of the blade, and a cutter button mounted in each socket.

12. A cutter comprising a body portion having a longitudinal axis, a plurality of removable blades mounted on the body and disposed generally in a longitudinal direction with respect to the body, the outer faces of the blades forming tread and flange portions that are substantially congruent respectively with the tread and flange of a vehicle wheel of the class described, each blade having a plurality of concave sockets disposed in a side face thereof and extending substantially at right angles to the axis of the cutter, each socket opening out through the outer face of the blade, and a cutter button having a plurality of cutting edges rotatably mounted in each socket with one of the cutting edges projecting through the opening to a position above the outer face of the blade.

13. A cutter comprising a body portion having a longitudinal axis, a plurality of removable blades mounted on the body and disposed generally in a longitudinal direction with respect to the body, the outer faces of the blades forming tread and flange portions that are substantially congruent respectively with the tread and flange of a vehicle wheel of the class described, each blade having a plurality of concave sockets disposed in a side face thereof and adapted to receive a cutter button.

14. A cutter comprising a body portion having a longitudinal axis, a plurality of ribs on the body disposed generally in a longitudinal direction with respect to the body, the outer faces of the ribs forming tread and flange portions that are substantially congruent respectively with respect to the tread and flange of a vehicle wheel of the class described, the ribs being adapted to support a plurality of cutter buttons.

15. A cutter comprising a body portion having a longitudinal axis, a plurality of ribs on the body disposed generally in a longitudinal direction with respect to the body, the outer faces of the ribs forming tread and flange portions that are substantially congruent respectively with respect to the tread and flange of a vehicle wheel of the class described, each rib being provided with a plurality of sockets in one side face thereof spaced throughout the length of the rib, each socket being adapted to receive and rotatably support a cutter button.

16. A cutter comprising a body having a longitudinal axis, a plurality of cutter buttons mounted about the periphery of the body, each cutter button having an end face disposed substantially normal to the longitudinal axis of the button, a plurality of cutting edges disposed about the periphery of the end face, each cutter button being indexable to bring successive cutting edges into cutting position, each cutter button being positioned with its longitudinal axis disposed substantially normal to a radius of the body, the entire plurality of buttons providing a set of cutting edges all lying on a surface of revolution about the body axis, each of which cutting edge provides a transverse increment of cut across the cutter body.

17. A cutter comprising a body of substantially circular cross section, a plurality of ribs disposed generally longitudinally of the body but spaced apart circumferentially, and a plurality of cutter buttons mounted on each rib with the longitudinal axis of each button substantially normal to a radius of the body and arranged substantially side by side along the length of the rib, each button being cylindrical in shape and having an end face providing a plurality of cutting edges about the periphery of the end face and being rotatably indexable about its longitudinal axis to bring successive cutting edges into cutting position, each button being arranged with the plane of its cutting edge disposed substantially parallel with the longitudinal axis of the cutter, and at a small angle with respect to the radial plane at that point, the buttons along each rib being so aligned with the buttons on the next adjacent rib that each cutting edge provides an independent increment of cut across the cutter body.

18. A cutter comprising a body of substantially circular cross section, a plurality of ribs disposed generally longitudinally of the body but spaced apart circumferentially, each having a plurality of sockets disposed in a side face thereof, and a plurality of cutter buttons mounted in said sockets with a minor portion of each button projecting beyond the outer face of the rib, each button being cylindrical in cross sectional shape and being rotatable about its longitudinal axis, the buttons along each rib being so aligned with the buttons on the next adjacent rib that the buttons are arranged approximately in helical progression about the circumference of the body.

19. A cutter comprising a body of substantially circular cross section, a plurality of spaced cutter buttons embedded about the periphery of said body with the longitudinal axis of each button being substantially normal to a radius of said body, and with a minor portion of each button projecting beyond the outer surface of said body, each button being indexable about its longitudinal axis and arranged to provide an independent increment of cut across the cutter body.

20. A cutter comprising a body of substantially circular cross section, a plurality of spaced cutter buttons embedded on said body and arranged substantially side by side generally longitudinally along the length of the body, with a minor portion of each button projecting beyond the outer surface of said body, the entire plurality of buttons lying on a surface of revolution about the body axis which is congruent with the desired contour of a work piece.

21. A cutter comprising a body having a surface adapted to receive a plurality of cutter buttons, a plurality of cylindrical cutter buttons embedded within said surface and arranged so as to be congruent with the desired contour of a work piece, a minor portion of each button projecting beyond the said surface, to expose a cutting edge to the work piece, the cutting edge of each button providing an independent increment of cut partially overlapping the increment of cut of the cutting edge of at least one other button.

22. A cutter comprising a body having a surface adapted to receive a plurality of cutter buttons, a plurality of cylindrical cutter buttons embedded within said surface and arranged so as to be congruent with the desired contour of a work piece, each button having an end face normal to its longitudinal axis and providing a plurality of cutting edges, a minor portion of each button projecting beyond the said surface, to expose a cutting edge to the work piece, the cutting edge of each button providing an independent increment of cut partially overlapping the increment of cut of the cutting edge of at least one other button, each button being indexable about its longitudinal axis to bring successive cutting edges into cutting position.

ALFRED L. THOMPSON.
KARL T. NYSTROM.
JESSE H. McQUIDDY.
RICHARD B. STANLEY.

References Cited in the file of this patent

UNITED STATES PATENTS

| Number | Name | Date |
|---|---|---|
| 1,025,724 | Snyder | May 7, 1912 |
| 1,342,240 | Walter | June 1, 1920 |

(Other references on following page)

UNITED STATES PATENTS

| Number | Name | Date |
|---|---|---|
| 1,432,579 | Vauclain et al. | Oct. 17, 1922 |
| 2,248,931 | Anania | July 15, 1941 |
| 2,289,344 | Cederleaf | July 14, 1942 |
| 2,396,289 | Ross | Mar. 12, 1946 |
| 2,581,609 | Small | Jan. 8, 1952 |

FOREIGN PATENTS

| Number | Country | Date |
|---|---|---|
| 2,034 | Great Britain | Aug. 2, 1871 |
| 16,243 | Great Britain | Sept. 10, 1892 |
| 164,047 | Great Britain | June 3, 1921 |
| 320,809 | Great Britain | Oct. 24, 1929 |
| 348,600 | France | Feb. 14, 1905 |
| 602,760 | Great Britain | June 2, 1948 |

OTHER REFERENCES

Kennametal Catalog No. 49, Published May, 1945 on Cemented Carbides, by Kennametal, Latrobe, Pa.